United States Patent [19]

Foote et al.

[11] Patent Number: 5,760,817
[45] Date of Patent: Jun. 2, 1998

[54] LASER PRINTER WITH APPARATUS TO REDUCE BANDING BY SERVO ADJUSTMENT OF A SCANNED LASER BEAM

[75] Inventors: Wayne E. Foote, Eagle; Richard G. Sevier, Boise, both of Id.

[73] Assignee: Hewlett-Packard Company, Palo Alto, Calif.

[21] Appl. No.: 621,053

[22] Filed: Mar. 22, 1996

Related U.S. Application Data

[63] Continuation of Ser. No. 262,405, Jun. 20, 1994, abandoned.

[51] Int. Cl.$^6$ .............. B41J 2/47; B41J 2/435; G11B 7/08; G01D 15/34
[52] U.S. Cl. .............. 347/248; 347/261
[58] Field of Search .............. 347/116, 248, 347/133, 250, 260

[56] References Cited

U.S. PATENT DOCUMENTS

| | | | |
|---|---|---|---|
| 4,167,024 | 9/1979 | Hamisch | 347/234 |
| 4,227,070 | 10/1980 | Hopson et al. | 377/37 |
| 5,049,897 | 9/1991 | Ng | 347/250 |
| 5,083,140 | 1/1992 | Peterson et al. | 347/248 |
| 5,153,644 | 10/1992 | Yang et al. | 347/247 |
| 5,245,181 | 9/1993 | Cho | 358/481 |
| 5,264,870 | 11/1993 | Egawa | 347/248 |

FOREIGN PATENT DOCUMENTS 0144 008  11/1984  European Pat. Off. .

*Primary Examiner*—Benjamin R. Fuller
*Assistant Examiner*—Raquel Yvette Gordon

[57] ABSTRACT

A print apparatus includes a photoconductor and a mechanical system for moving the photoconductor past a scan line exposure station. The print apparatus includes a test signal generator for providing outputs indicative of the movement of the photoconductor. A first comparator produces a first position error signal that is derived from a difference between a reference signal and a position error signal output, such position error signal indicating that the position of the photoconductor differs from a predetermined print position that is determinable with respect to the reference signal. The print apparatus further includes a laser beam scanner and a beam detector for producing a scan position signal. A second comparator is responsive to the scan position signal and the position error signal from the first comparator to produce a beam deflection control signal that is applied to a beam deflector. The beam deflector moves the laser beam in a direction which reduces the beam deflection control signal and position the laser scan at a position closer to a predetermined print position.

15 Claims, 5 Drawing Sheets

LASER PRINTER WITH APPARATUS TO REDUCE BANDING BY SERVO ADJUSTMENT OF A SCANNED LASER BEAM

This is a continuation of application Ser. No. 08/262,405 filed on Jun. 20, 1994 now abandoned.

FIELD OF THE INVENTION

This invention relates to laser print mechanisms and, more particularly, to a system for reducing "banding" which occurs when print scan lines in a laser printer are subject to positioning errors.

BACKGROUND OF THE INVENTION

Banding is a term used to define alternate streaks of light and dark areas (or bands) that are produced on an output sheet in a laser printer. These bands are produced as a result of non-constant placement of print scan lines. Dark bands are produced when the scan lines are closer together and lighter bands are produced when the scan lines are farther apart.

In a laser printer, pitch variation between scan lines can occur as the result of a number of system errors. The major cause is speed variations in the moving photoconductor. Those speed variations occur due to imperfections in the mechanical parts that comprise the photoconductor drive system. These imperfections may include out-of-round parts, gear inaccuracies, bearing runouts, mechanical coupling errors, etc. Structure vibration states which result from mechanical resonances can also cause relative motion between a laser scanner and the photoconductor and result in a banding affect on output sheets.

In general, banding is not apparent to the user when documents contain only text. However, because the resolution available from laser printers has seen substantial improvements, such printers are now employed to print full grey scale graphics images. Banding is clearly visible in such images.

The prior art has attempted to solve the banding problem by specifying more accurate (and more expensive) parts for the laser printer. Vibration problems have been reduced through provision of stiffer structures that are usually heavier and more expensive. Further, increasingly more sophisticated (and expensive) speed controls for drive motors have been implemented so as to assure relatively constant photoconductor speeds. Nevertheless, for laser printers that employ photoconductive belts, such improvements still do not eliminate banding. This is due to the fact that the belts themselves evidence some stretch and positional modification when subjected to impulse loading. A feedback system which attempts to correct for mechanical movements of the photoconductor and/or drive system cannot respond fast enough to totally overcome the banding effect. While high bandwidth servo systems approach a solution to the problem, they are still confronted with the problem of altering speed and/or position of mechanical elements which have both inertia and momentum that tend to negate the immediate correction actions. Such mechanical elements also exhibit a "resiliency" that tends to limit the responsiveness of the system to high frequency correction actions.

Accordingly, it is an object of this invention to provide an improved system for reduction of banding in a laser printer.

It is a further object of this invention to provide a banding reduction system in a laser printer wherein few additional mechanical parts are required.

It is yet another object of this invention to provide a banding reduction system for a laser printer wherein the banding reduction action is not dependent upon a high bandwidth servo system for correcting printer mechanical movements.

SUMMARY OF THE INVENTION

A print apparatus includes a photoconductor and a mechanical system for moving the photoconductor past a scan line exposure station. The print apparatus includes a test signal generator for providing outputs indicative of the movement of the photoconductor. A first comparator produces a first position error signal that is derived from a difference between a reference signal and a position error signal output, such position error signal indicating that the position of the photoconductor differs from a predetermined print position that is determinable with respect to the reference signal. The print apparatus further includes a laser beam scanner and a beam detector for producing a scan position signal. A second comparator is responsive to the scan position signal and the position error signal from the first comparator to produce a beam deflection control signal that is applied to a beam deflector. The beam deflector moves the laser beam in a direction which reduces the beam deflection control signal and positions the laser scan at a position closer to a predetermined print position.

DETAILED DESCRIPTION OF THE INVENTION

Figure 1:
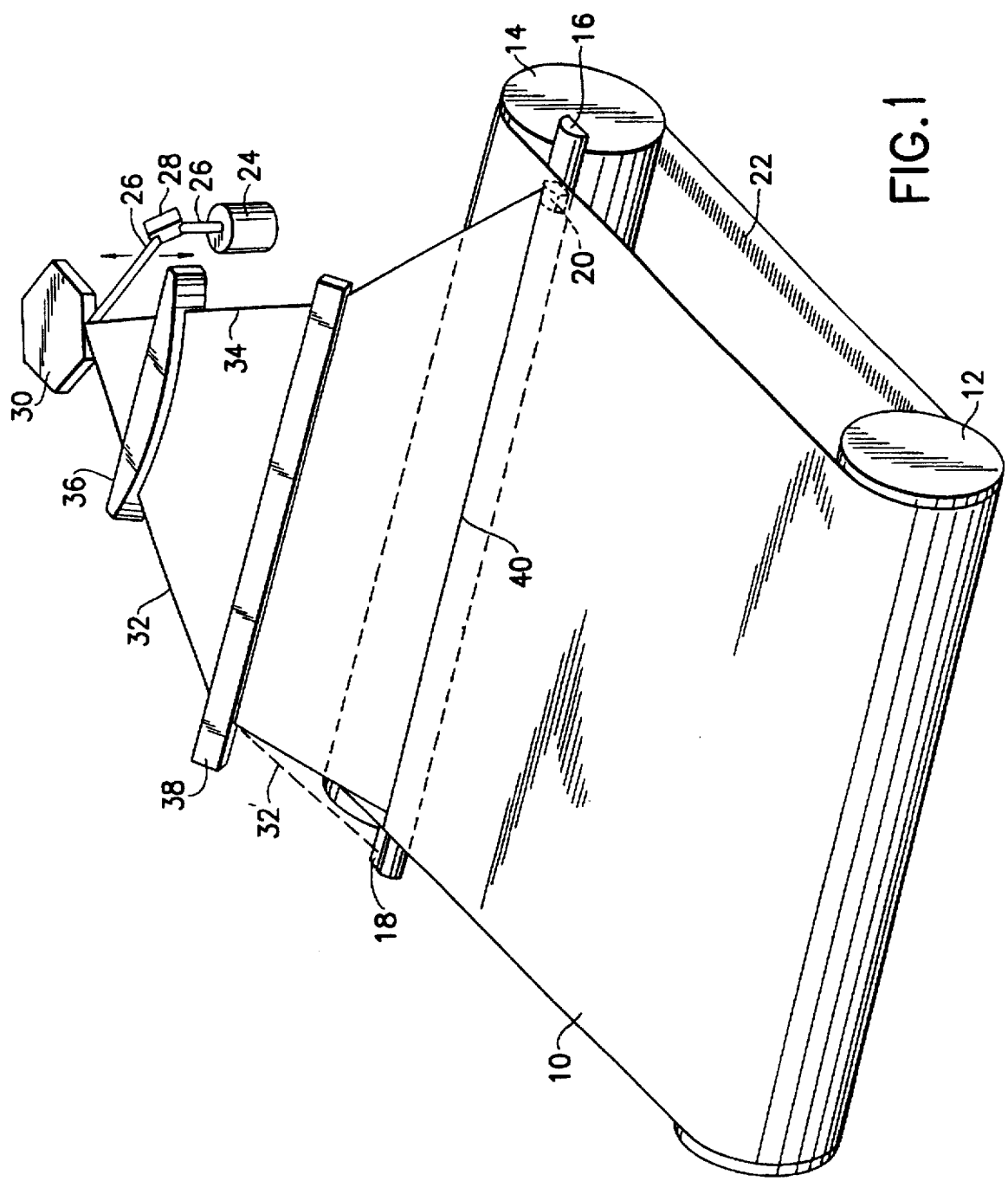
FIG. 1 is a perspective view of a laser printer that incorporates a first embodiment of the invention.

FIG. 1 illustrates principal components of a laser printer that incorporates the invention hereof. A photoconductor belt 10 passes over an idler roller 12 and a drive roller 14. Drive roller 14 is operated by a drive motor which, in turn, transmits its rotary action through a gear train to drive roller 14. (The drive motor and coupling gear train are not shown.) Photoconductor belt 10 passes over a laser write platen 16 which has an optical sensor 18 mounted at one extremity. A magnetic sense head 20 is positioned at another extremity of laser write platen 16 and senses signals that are generated when a magnetic synch track 22 passes in contact therewith. Magnetic synch track 22 is recorded on a magnetic track along the interior surface of photoconductor belt 10 and provides synchronizing signals to enable positional detection of photoconductor belt 10 in relation to a reference clock frequency.

A laser assembly 24 directs a laser beam 26 at a galvano-motor-mirror assembly 28 (hereafter referred to as "galvano") which reflects laser beam 26 towards a rotating faceted mirror 30. The rotation of faceted mirror 30, in the known manner, scans laser beam 26 along a path between scan extremity lines 32 and 34. The scanned laser beam passes through a lens 36 and is reflected by an elongated mirror 38 to create a raster scan line 40 on photo conductor belt 10 directly over laser write platen 16. To implement this invention, the scanned laser beam is caused to scan past the edge of photoconductor belt 10 and to intercept optical sensor 18 (as shown by dashed scan line 32').

Optical sensor 18 provides an error voltage when it intercepts a laser beam that is offset from the physical center line of sensor 18. While various types of optical sensors may be employed for optical sensor 18, one that is preferred includes two light sensitive semiconductors that are separated by a nonlight responsive area that is positioned directly at the centerline of optical sensor 18. As a result, a change in position of an incident laser beam from the centerline of optical sensor 18 will cause one or the other of the adjacent photodetectors to provide an output voltage, which output voltage is employed as an error potential to enable a positional correction voltage to be generated.

Figure 2:
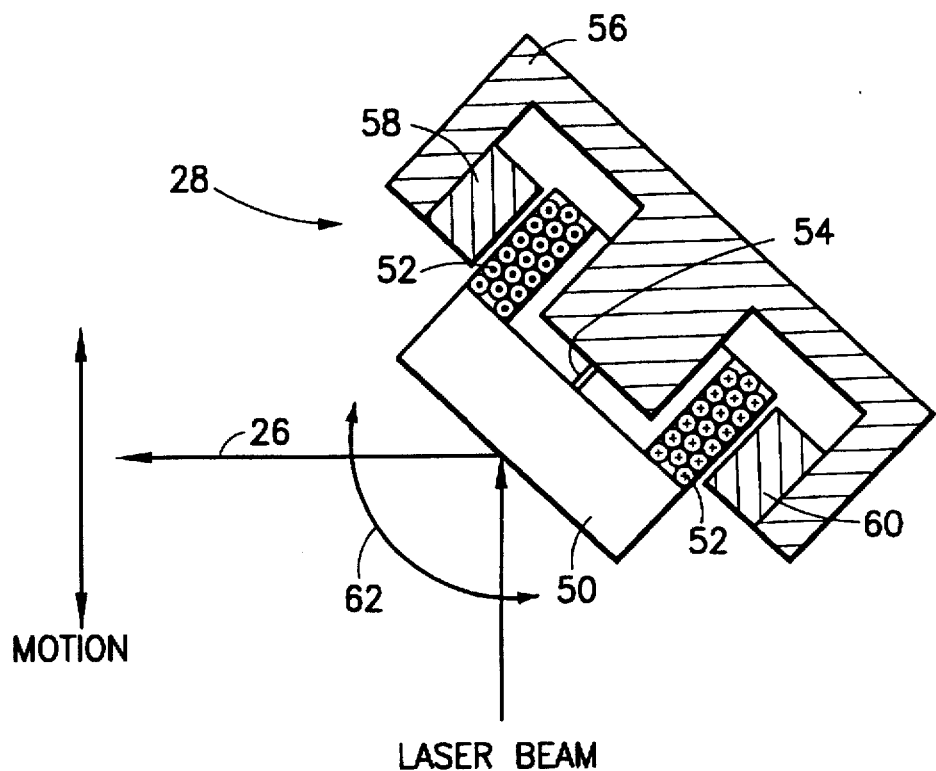
FIG. 2 is a side sectional view of a galvanometer-operated mirror assembly employed to reposition a laser beam in accordance with a position error signal derived from mechanical drive components within the printer.

Positional correction of the laser beam is achieved by moving galvano 28 to cause beam 26 to reposition itself with respect to rotating faceted mirror 30. In FIG. 2, a sectional view of galvano 28 is illustrated. In essence, galvano 28 is a motor-driven mirror that is repositionable about an axis that is perpendicular to the paper. Mirror 50 is mounted on a wire-wound rotor 52. A flexible mount 54 connects mirror 50/rotor 52 to a magnetic return stator structure 56. A pair of magnets 58 and 60 are positioned on stator structure 56 and about rotor 52. By appropriate energization of rotor structure 52, mirror 50 may be caused to move in the directions shown by arrows 62. As a result, laser beam 26 may be altered in direction in accordance with the positioning of mirror 50 which is, in turn, dependent upon the energizing current applied to wire-wound rotor 52.

Figure 3:
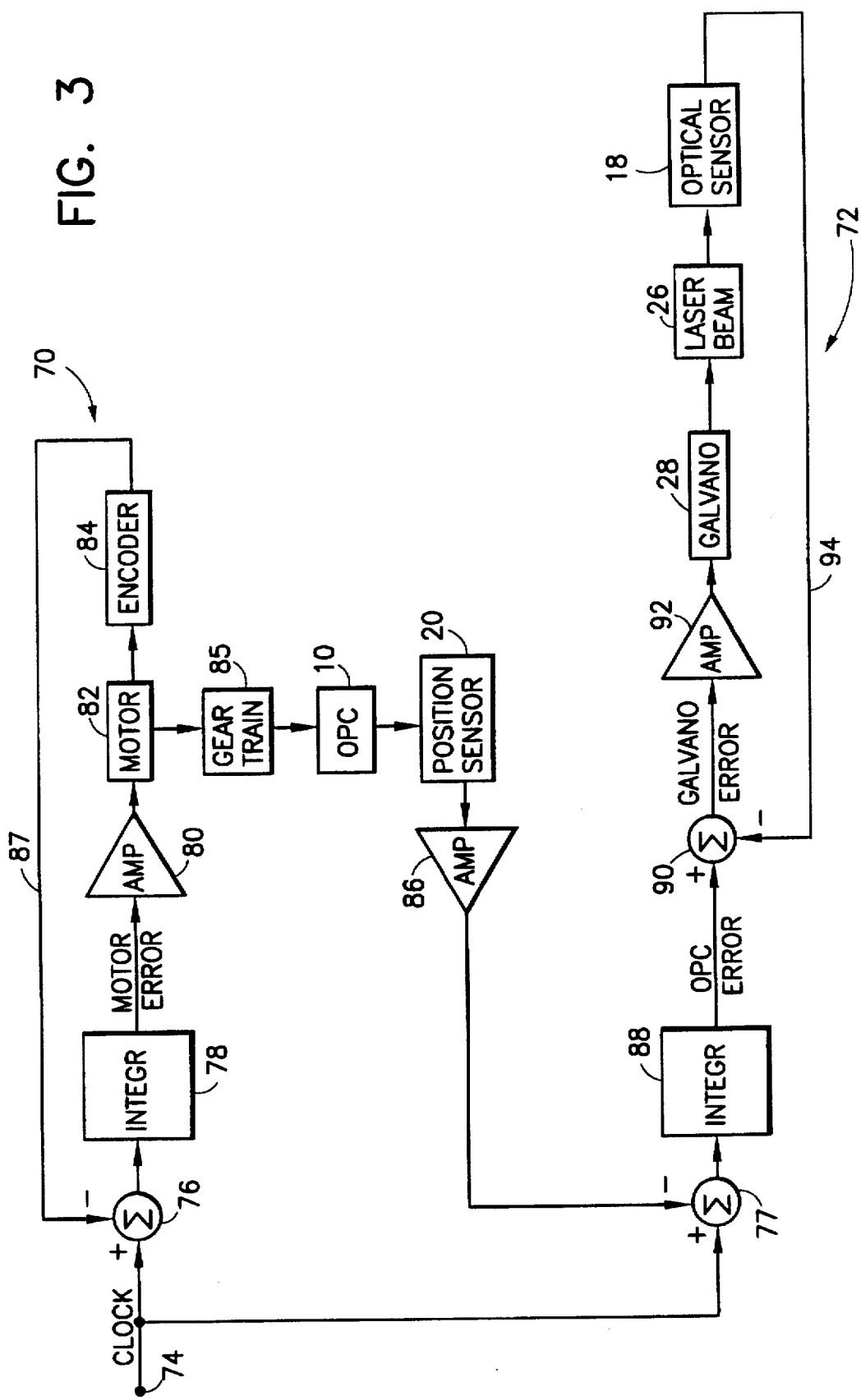
FIG. 3 is a block diagram of electronic circuits employed in the first embodiment of the invention shown in FIG. 1.

Turning to FIG. 3, a circuit is shown which enables banding reduction to be accomplished through the use of the structure shown in FIGS. 1 and 2. It will be recalled that banding is the result of pitch errors between succeeding raster scan lines 40 (FIG. 1) which cause a series of succeeding scan lines to be either increasingly closer together or farther apart, as the case may be.

The banding reduction control circuit comprises two control loops 70 and 72, of which control loop 70 is a standard motor control servo loop present in prior art laser printers. Control loop 72 implements the invention in conjunction with control loop 70. A clock signal is applied via an input 74 to summers 76 and 78. Ideally, if the mechanical drive system for photoconductor belt 10 was "perfect", the positioning of each scan line 40 in relation to clock signals applied to input 74 would be precise and repeatable. However, due to the above-described mechanical errors, spacings between successive scan lines 40 or groups of successive scan lines can vary to cause the banding effect. The output from summer 76 is applied through an integrator 78 and an amplifier 80 to motor 82. An encoder 84 provides a signal train on feedback line 87 that is indicative of succeeding instantaneous positions of motor 82. The difference between the feedback signals on line 87 and the input clock signals applied via input 74 provides a motor error voltage which is utilized to correct the speed of motor 82 in the known manner. Control loop 70 acts in a direction to drive the output of summer 76 towards zero.

As motor 82 rotates, it operates a gear train 85 which, in turn, causes rotation of drive roller 16 and photoconductor belt 10. The instantaneous position of photoconductor belt 10 is sensed by an output from position sensor 20 which, in this case, is a magnetic head. Those skilled in the art will fully understand that any appropriate positional sensing system can be utilized to provide a pulse train that is synchronized with the movement of photoconductor 10 (e.g., optical, electrical or otherwise).

The pulse sequence output from position sensor 20 is fed via an amplifier 86 as an input to summer 77. The output from summer 77 (as integrated by integrator 88) provides a photoconductor belt error signal that include a component which is directly related to any mechanical positioning errors. A positioning error causes a variation in an expected time difference between pulses from position sensor 20 and clock pulses applied to summer 77. As a result, the output from integrator 88 is a photoconductor position error signal that is applied to summer 90.

Summer 90 controls the operation of loop 72, which comprises amplifier 92, galvano 28, laser beam 26 and optical sensor 18. The objective of loop 72 is to adjust galvano 28 to reposition laser beam 26 (as sensed by optical sensor 18) in a direction to reduce the difference between a feedback voltage applied via line 94 to summer 90 and the photoconductor belt error potential as applied to summer 90. More specifically, if the photoconductor belt error signal, by its value, indicates that photoconductor 10 is lagging from where it should properly be positioned, the voltage applied to summer 90 is increased, thereby causing a larger galvano error signal to be applied, via amplifier 92, to galvano 28. Mirror 50 (FIG. 2) is thus rotated to position laser beam 26 to compensate for the positional lag of photoconductor 10. Galvano 28 thus is caused to move scan line 40 in a direction to maintain the spacing from the immediately previous scan line at a constant value. More specifically, galvano 28 deflects laser beam 26 so as to intercept a facet on rotating faceted mirror 30 at a displaced position. That displaced position results in a movement of scan line 40 with respect to laser write platen 20.

Because optical sensor 18 only provides an updated correction signal once per scan, laser beam 26 is only repositioned once per scan. As a result, optical sensor 18, as shown in FIG. 3, incorporates a voltage holding circuit that enables the maintenance of the feedback level on line 94.

Figure 4:
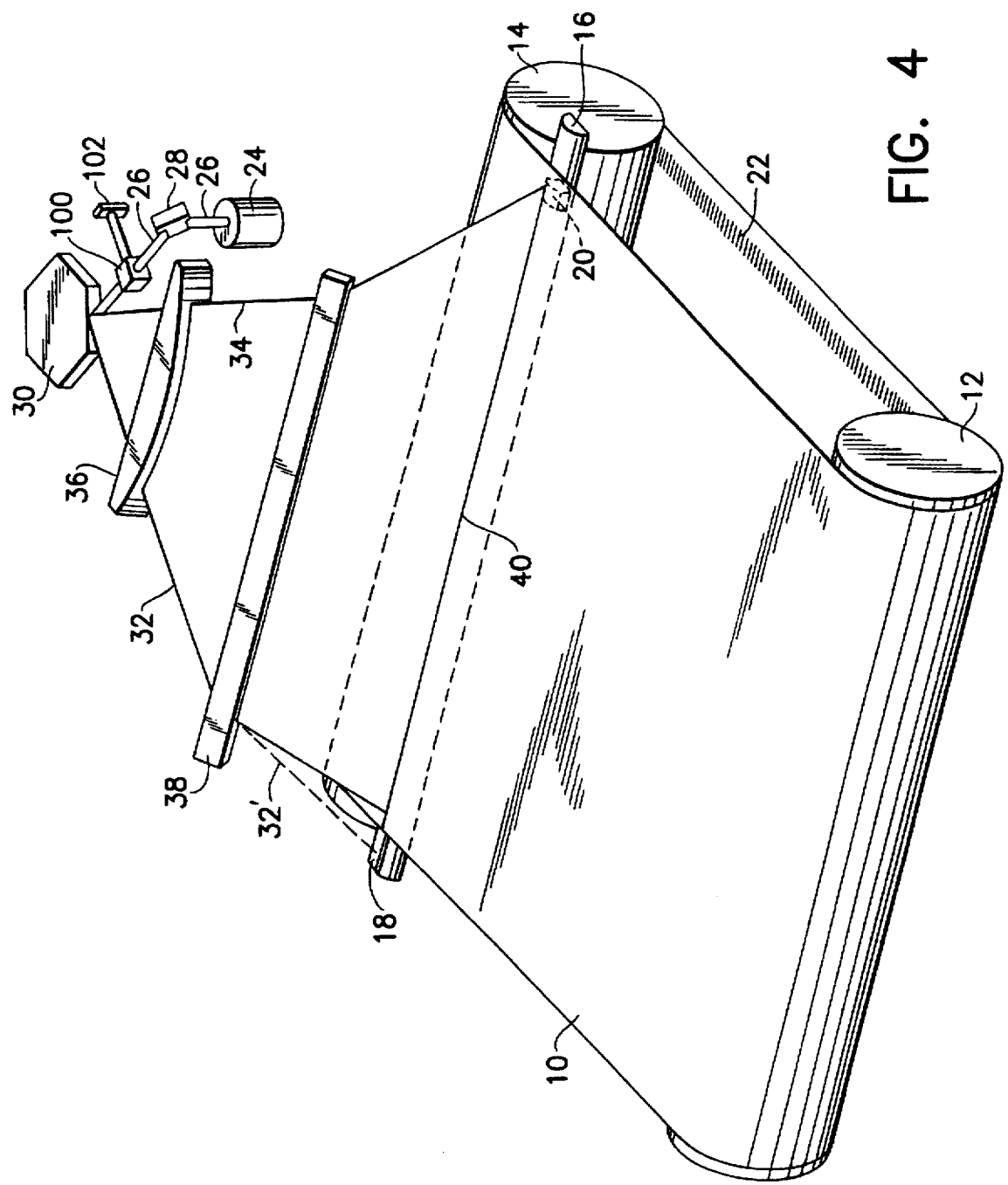
FIG. 4 is a perspective view of a laser printer showing a second embodiment of the invention.
Figure 5:
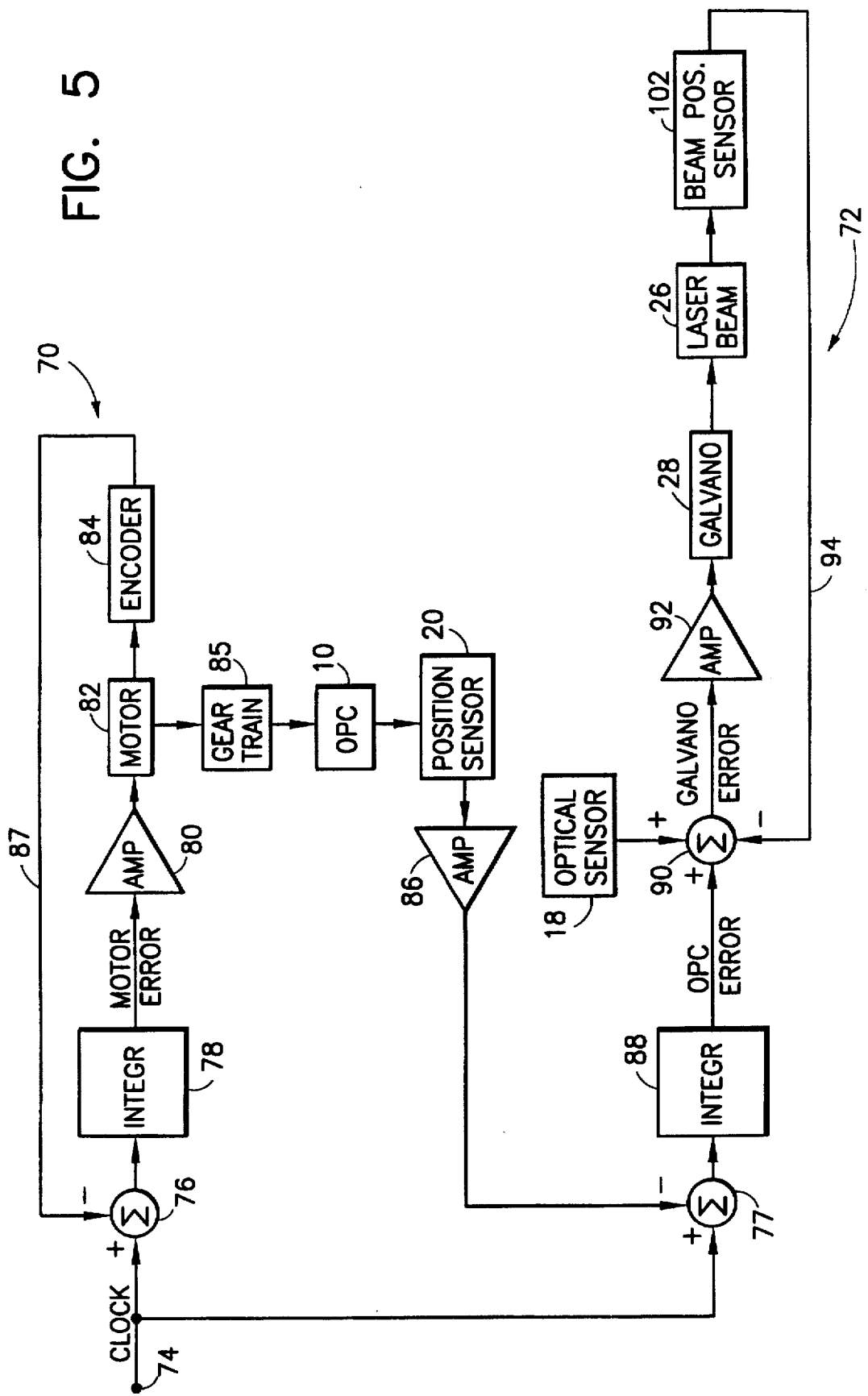
FIG. 5 is a block diagram of electronic circuits utilized to implement the second embodiment shown in FIG. 4.

Turning to FIGS. 4 and 5, a further embodiment of the invention is shown which enables a beam position signal to be generated during a full scan and obviates the need for optical sensor 18 to include a voltage holding circuit. In FIG. 4, each element shown therein that is common to an element shown in FIG. 1 is numbered identically. It is to be noted that a beam splitter 100 has been placed in the beam path between galvano 28 and rotating faceted mirror 30. Beam splitter 100 directs beam 26 towards a beam position sensor 102 which is constructed similarly to optical sensor 18. Beam position sensor generates a continuous beam position voltage. The output from beam position sensor 102 is employed in the control loop 72 shown in FIG. 5. Optical sensor 18 is still employed but provides its output directly to summer 90. Beam position sensor 102 replaces optical sensor 18 in control loop 72 and enables a continuous beam position voltage to be fed via line 94 to summer 90. As beam position sensor 102 is now located to provide a continuous beam position feedback potential on line 94, feedback loop 72 need not await for a change in output from optical sensor 18 to provide a correction signal to galvano 28.

The output from optical sensor 18, as applied to summer 90, enables system errors that occur between beam splitter 100 and scan line 40 to be corrected. For instance, the output from optical sensor 18 will cause an error voltage from summer 90 in the event anomalies are present in the facets of rotating faceted mirror 30. Furthermore, optical sensor 18 will also cause an error voltage should a vibrational mode occur in the operating mechanism. Optical sensor 18 thus enables a periodic error input to supplement the error potential derived from beam position sensor 102 and enables a more precise control of laser beam 26.

The above described embodiments, by repositioning laser scan line 40 in accordance with photoconductor error positioning voltages, enables feedback signals to be generated at electronic speed to correct for mechanical anomalies that cause a mispositioning of photoconductor belt 10. As a result, banding is minimized and higher quality graphics images are produced.

It should be understood that the foregoing description is only illustrative of the invention. Various alternatives and modifications can be devised by those skilled in the art without departing from the invention. For instance, while a motor structure has been shown for controlling galvano 28, piezoelectric control is equally applicable. Accordingly, the present invention is intended to embrace all such alternatives, modifications and variances which fall within the scope of the appended claims.

What is claimed is:

1. A print apparatus including a laser for generating a laser beam, a photoconductor and mechanical means for moving said photoconductor past a laser beam scan line exposure position so as to enable a plurality of scan lines to expose said photoconductor along a page movement direction, said print apparatus comprising:

photoconductor position sensing means for producing a photoconductor position error signal that is indicative of a mispositioning of said photoconductor; and beam correction means for producing an error correction signal in response to said photoconductor position error signal;

laser beam scan means for directing a laser beam in a scan line across said photoconductor; and optical means positioned in a path of said laser beam between said laser and said laser beam scan means for employing said error correction signal to move said laser beam with respect to said laser beam scan means so as to further move a scan line on said photoconductor, and in relation to said page movement direction, to a position that is a determined distance from a previous laser beam scan line on said photoconductor.

2. The print apparatus as recited in claim 1 wherein said optical means comprises:

a mirror positioned to intercept said laser beam; and actuator means responsive to said error correction signal for orienting said mirror to reposition said laser beam scan line on said photoconductor.

3. The print apparatus as recited in claim 2, wherein said beam correction means further comprises:

laser beam sensor means for intercepting said laser beam and providing a laser position error signal; and circuit means for responding to said laser position error signal and said photoconductor position error signal to produce said error correction signal for control of said actuator means.

4. The print apparatus as recited in claim 3 wherein said laser beam sensor means is juxtaposed to said laser scan line exposure position and produces said laser position error signal at least once per laser scan.

5. The print apparatus as recited in claim 2, wherein said laser beam scan means comprises:

a rotating faceted mirror for scanning said laser beam across said laser scan line exposure positions.

6. The print apparatus as recited in claim 5 further comprising:

a second laser beam sensor means juxtaposed to said laser scan line exposure position for producing a second position error signal and for feeding said second position error signal to said circuit means as an additional correction signal.

7. The print apparatus as recited in claim 2 wherein said actuator means is a motor structure, said mirror mounted on a rotor that forms a part of said motor structure.

8. The print apparatus as recited in claim 2 wherein said actuator means includes piezoelectric means for moving said mirror.

9. A print apparatus including a photoconductor, and mechanical means for moving said photoconductor past a scan line exposure station, said print apparatus comprising:

reference signal means for producing a reference signal;

sensor means for producing pulsed signals indicative of movement of said photoconductor;

first circuit means for producing a position error signal derived from a difference between said reference signal and said pulsed signals, said position error signal indicative of a position of said photoconductor which differs from a predetermined laser exposure position determined with respect to said reference signal;

laser beam scan means for directing a laser beam in a scan line across said photoconductor;

beam detector means for producing a beam scan position signal in response to an interception of said laser beam;

beam deflector means; and second circuit means responsive to said beam scan position signal from said beam detector means and said position error signal from said first circuit means for producing a deflection control signal for said beam deflector means, said deflection control signal causing movement of said beam deflector means in a direction which moves said laser beam in a page movement direction and causes said laser beam to scan across said photoconductor at a position closer to said predetermined laser exposure position.

10. The print apparatus as recited in claim 9 wherein said beam deflector means comprises:

a deflection mirror for intercepting said laser beam; and actuator means responsive to said beam deflection control signal to re-orient said deflection mirror so as to reposition said scan line on said photoconductor.

11. The print apparatus as recited in claim 10 wherein said laser beam scan means comprises a rotatable faceted mirror and a laser, said deflection mirror positioned in a beam path between said rotatable faceted mirror and said laser.

12. The print apparatus as recited in claim 10 wherein said actuator means comprises a motor structure that includes a rotor for mounting said mirror, a stator and field windings connected to receive said beam deflection control signal.

13. The print apparatus as recited in claim 10 wherein said actuator means is a piezoelectric operated actuator.

14. The print apparatus as recited in claim 10 wherein said photoconductor is configured as an organic photoconductor belt which moves in contact with a laser write platen, said laser write platen supporting said beam detector means so that a beam scan position signal is issued at least once each scan of said laser beam.

15. The print apparatus as recited in claim 14, further comprising:

additional beam detector means positioned in said beam path for feeding to said second circuit means, a second beam position signal during a full scan of said laser beam.

* * * * *